United States Patent Office 2,750,435
Patented June 12, 1956

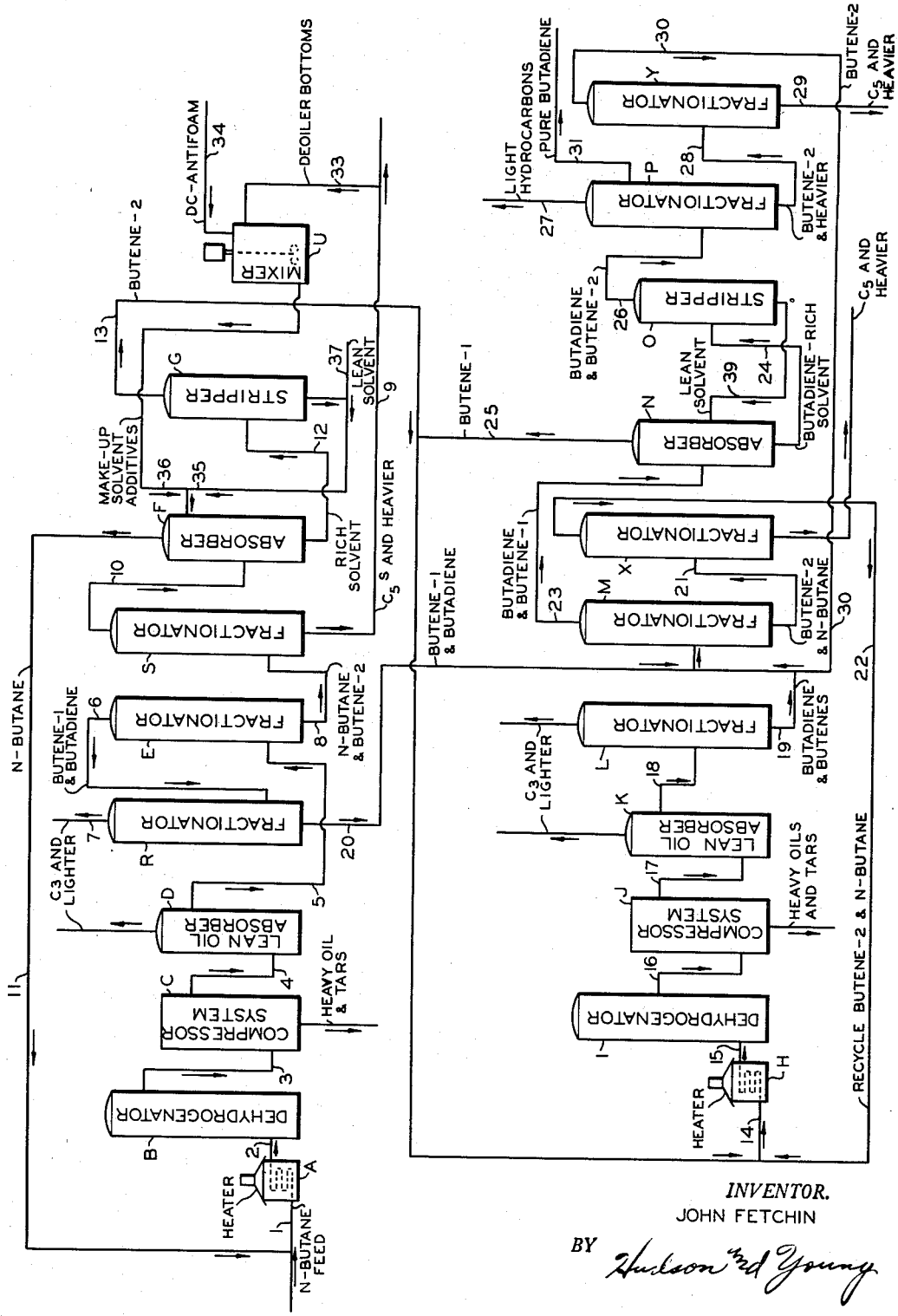

---

2,750,435

PROCESS FOR SEPARATION OF C₄ HYDROCARBONS AND SOLVENT THEREFOR

John Fetchin, Pasadena, Tex., assignor to Phillips Petroleum Company, a corporation of Delaware Application December 17, 1954, Serial No. 476,090

29 Claims. (Cl. 260—680)

This invention relates to methods for separating and recovering individual $C_4$ hydrocarbons from complex hydrocarbon mixtures comprising both normally gaseous and normally liquid hydrocarbons of both saturated and unsaturated linkages, and to a selective solvent for effecting such separations. A specific aspect of the invention pertains to a process for the two-stage dehydrogenation of n-butane to butadiene, including the recovery of the butadiene in a substantially pure state.

In a commercial process for the manufacture of butadiene, including the following steps (1) butane dehydrogenation to butenes, (2) butene recovery or purification, (3) butene dehydrogenation to butadiene, and (4) butadiene recovery or purification, the use of furfural as a selective solvent in the extractive distillation of butenes and butadiene has made the process practical and economical. The use of furfural permits separations of $C_4$ hydrocarbons which were heretofore considered impossible and impractical on a commercial scale. It is this type of separation upon which the production of high purity butadiene depends. Furfural absorbers are used to separate normal butane from unsaturated $C_4$ hydrocarbons (step 2) and also for separating butadiene from butenes in the butadiene purification or recovery step (step 4). These absorber columns are of the conventional bubble cap type and in the preferred modification are constructed in two fifty-tray sections. The function of the absorbers is to separate the product of that step from the recycle to the preceding step while the remainder of the columns (fractionators) function on the whole as auxiliary columns to increase the absorber feed purity or to process the by-product streams. Since butenes in the normal butane recycle to the step (1) dehydrogenation and butadiene in the butene recycle to the step (3) dehydrogenation are partially destroyed over the catalysts, substantial losses are suffered when upset or inferior operation of the absorbers occurs. In addition, normal butane in the kettle product takes a "free ride" through the butene dehydrogenation step, acting as a diluent therein. Also, butenes in the kettle product of the step (4) absorbers unnecessarily overload the butadiene purification column downstream of the absorbers.

One of the major causes of absorber upsets and inefficient operation has been furfural foaming. Stacking or column flooding has primarily resulted from excessive foaming of the furfural solvent. Feed rates, furfural feed temperature, and contaminants are the chief factors influencing the foaming and stacking tendency of the furfural system. Stacking tendency is proportional to feed rates, i. e., the higher the feed rate the greater the tendency to stack. Hence, during periods of severe foaming, column capacity is reduced substantially. Cold furfural feed creates greater internal reflux and thereby increases the tendency to stack. Contaminants, including butadiene dimer, heavy hydrocarbon oils, dissolved hydrocarbons and trace impurities, have been effective foam causers in the furfural system. Foaming not only reduces column capacity, but causes poor separation; and stacking results in interrupted operations and off-specification product.

In combatting the foam problem in furfural absorbers, a number of practices have been found essential to commercially economical operation of the absorbers. Since oils have been found to promote foaming in the furfural, the feed to the step (2) absorbers has been deoiled in a twenty-tray bubble cap column. A butane wash unit has been provided to extract the hydrocarbon oils (including butadiene dimer) from the lean furfural before recycling the same to the absorbers. This unit requires extra processing of the furfural and entails appreciable loss of the furfural in the subsequent recovery operations. Laboratory investigations failed to answer many basic questions regarding foam producing contaminants because of the complication of trace impurities, since foaming can be produced by contaminants with concentrations as low as a few parts per million. Laboratory investigations were hampered in detecting these impurities by limitations of analytical procedures. Heavy hydrocarbon oils and butadiene dimer were known to be active foamers, but the addition of the butane wash unit which controls the concentrations of these contaminants, while it alleviated the situation, failed to eliminate the foaming problem. When foaming continued to be a constant problem despite control of these contaminants, investigation was directed to antifoams. A number of antifoam agents were tested by bubbling a $C_4$ hydrocarbon through lean furfural containing the antifoam agent being tested and measuring the maximum height obtained by the foam, then comparing the height with the maximum foam height of the lean furfural without the presence of the antifoam. All but one type of antifoam were found to be ineffective in reducing the foaming tendencies of furfural and in improving the efficiency of the butadiene process.

The principal object of the invention is to provide a highly improved and more efficient process for making butadiene from normal butane. Another object of the invention is to provide an improved selective solvent for the extractive distillation of mixtures of $C_4$ hydrocarbons. Another object is to provide a process for the selective absorption of less saturated $C_4$ hydrocarbons from a mixture of same with more saturated $C_4$ hydrocarbons. Another object of the invention is to provide a more efficient separation of butene-1 and butene-2 from n-butane obtained from the catalytic dehydrogenation of n-butane. A further object of the invention is to provide a more efficient separation of butadiene from butenes produced in the catalyst dehydrogenation of butenes to butadiene. It is also an object of the invention to increase the productive capacity of a butadiene plant of given capacity. A more specific object of the invention is to provide a method of introducing a specific antifoaming agent into a furfural absorption system. Other objects of the invention will become apparent from the accompanying disclosure.

It has been found that certain polymeric organo-silicon compounds when added to a furfural system being used in the extractive distillation of $C_4$ hydrocarbons vastly improve the efficiency of the separation. It is also found that the use of a mixed solvent consisting essentially of furfural and $C_5$-$C_{10}$ hydrocarbons, principally butadiene dimer, with lesser amounts of ethyl benzene and xylenes brings about unexpected and advantageous results in the practice of furfural extractive distillation. Apparently, the oil content of the furfural causes an increase in the $C_4$ hydrocarbon solubility so as to effect a better separation than can be made using furfural alone. The organic silicon compounds make it possible to operate the absorber columns when utilizing furfural containing more than 15 per cent of the oils gradually picked up by the furfural in the process (principally butadiene dimer). Butadiene dimer comprises about 29 weight per cent of the oil content while ethyl benzene and p-xylene are the chief constituents of the balance.

In operation prior to the use of polydimethyl siloxanes in the furfural solvent, it was found advantageous to maintain a water concentration of about 5 to 6 or 7 weight per cent so as to lower reboiler temperatures and decrease polymerization of furfural. With higher concentrations of oils in the solvent in conjunction with polydimethyl siloxanes of the class described the process is not materially affected by the presence or absence of water. If water is present in amounts greater than its solubility in the furfural-oil solvent, the excess will settle out as a separate phase in the surge tanks.

In practicing the invention, the organo-silicon polymers are merely dispersed in a suitable dispersing agent and introduced into the furfural line at some convenient point, preferably in the lean furfural stream leading to the absorber. Concentrations of these organo-silicon polymers in the solvent in the range of 1 to 20 parts per million have been found to effectively reduce foaming to such an extent that greatly improved efficiency and separation is obtained, even in the presence of more than 15 weight per cent of foam producing oils in the furfural. In fact oil concentrations up to 60 weight per cent of the solvent may be used in conjunction with these low concentrations of organo-silicon polymers (polydimethyl siloxanes), and it is preferred to utilize these oils in a concentration of 10 to 30 weight per cent of the solvent (furfural-oil mixture).

Higher oil concentration in the furfural effects more thorough stripping of the furfural from the polymers, the furfural content of the polymer from the re-run unit being lowered from more than three weight per cent to less than one per cent. In addition, the lines connecting various elements of the re-run equipment frequently became plugged under previous operation with low oil concentration, whereas operation with high oil concentration has been completely free of this problem.

As previously emphasized, the foaming problem in the separation of $C_4$ hydrocarbons with furfural by extractive distillation has been troublesome for a period of approximately ten years and the only partial and practical solution has been the continuous removal of the foam producing oils and trace impurities from the furfural as they gradually accumulate so as to maintain the concentration thereof sufficiently low (below about 3 weight per cent), by continuous butane washing of the lean furfural, to at least partially alleviate stacking. Even with the addition of the butane wash unit to the furfural system which controls the concentration of heavy hydrocarbon oils and particularly butadiene dimer which were known to be active foamers, foaming continued to be a constant problem, particularly during times when demand for butadiene was high and the butadiene plant was operated at near capacity. Over a period of years a great many antifoam agents were tested with a view to use in the furfural system. The antifoams tested include Ocenol; licithin; several organic compounds including eugenol, isoeugenol, guaiacol, vanillin, hydroquinone monomethyl ether; Nalco 70 and 71; and several Atlas agents, including Tween 80, Span 85, Span 20 and NNO. In testing the different materials, their surface activity was evaluated by determining the interfacial tension between a solution of lean furfural containing 0.1 per cent by weight of the surface active agent and n-hexane. To determine interfacial tension of the lean furfural with the various additives, the drop weight method was used. The procedure is based upon the weight of drops of a liquid falling slowly from the end of a burette which is immersed in a second liquid. For complete details of the method, Gucker and Meldrum, Physical Chemistry, American Book Company (1942), p. 134, may be used as a reference. The actual foaming characteristics of the different solutions of lean furfural containing the surface active agents were determined by the conventional diffuser's stone procedure. Results of the interfacial tensions and foam height are reported in Table I.

TABLE I

*Interfacial tension of lean furfural and antifoam agents in n-hexane*

| Additive, 0.1 wt. percent | Interfacial Tension, Dynes/centimeter | Foam Height, Inches |
| --- | --- | --- |
| Lean Furfural (Control) | 16.9 | 11 |
| Tween 80 (Atlas) | 10.2 | 11¾ |
| Span 85 (Atlas) | 12.4 | 12¾ |
| Span 20 (Atlas) | 13.1 | 14½ |
| NNO (Atlas) | 5.3 | 13½ |
| Lecithin | 4.0 | 10½ |
| Nalco 71 | 4.0 | 11¾ |
| DC Antifoam A | 2.4 | 7 |

In emulsions, one function of surface active agents is to reduce the resistance of mixing of two immiscible liquids. Theoretically, the closer the interfacial tension values approach zero the lower the resistance and, therefore, the more effective is the agent. The interfacial tension value between two liquids is an indication of the ease with which they will produce emulsions, but it is not necessarily an indication of emulsion stability. Since foam is only the dispersion of a gas in a liquid, these considerations may possibly apply to the furfural system. The results show the agents to be surface active in that the interfacial tension decreases with each determination as compared to the interfacial tension of the lean furfural alone in normal-hexane. Of those materials or agents shown in Table I, only one, DC Antifoam A, has a marked effect on the foaming qualities of the furfural; whereas the other surface active agents actually produce foam, although the interfacial tension was decreased by addition of the foam suppressors. "DC–200 Fluids" have been found to effect similar results to "DC Antifoam A."

U. S. Patent 2,528,465, October 31, 1950, assigned to California Research Corporation, discloses a number of alkoxy phenol compounds which have been found to be excellent foam inhibitors when added to lubricating oils. The patent is unusual in quoting results on so many specific examples of the class claimed. Of the foam inhibitors disclosed specifically in the patent, hydroquinone monomethyl ether, eugenol, isoeugenol, guaiacol, 2-hydroxy-3-methoxy-benzaldehyde, 2-methoxy-4-methyl phenol, vanillin and vanillyl alcohol were tested as foam inhibitors in a furfural system containing turbine oil. All of these compounds were obtained from the Eastman Kodak Company. The only two alkoxy phenols not tested were o-butoxy phenol and 1-hydroxy-2-methoxy anthraquinone.

All tests were conducted at room temperature. A weighed sample of furfural (approx. 170 g.) was placed in the 500 ml. graduate. Phillips' pure grade n-butane was used as the gaseous foaming agent. The velocity of the gas (n-butane) was adjusted to give a foam height of 7 or 9 inches on the furfural sample that contained no inhibitor. The mercury differential in the manometer was noted and all other tests were conducted at that manometer reading. After the foam height had reached its maximum, the measured foam height and time required for the foam to disappear after the gas flow was shut off were recorded. These quantities were then determined on furfural samples containing varying amounts of inhibitor. In the cases where the inhibitor was liquid the inhibitor was added by means of a calibrated eye dropper. Where the inhibitor was a solid, a known quantity was added directly to the sample. In all cases the inhibitor went into solution immediately.

The results are tabulated in Tables II and III. They show that at room temperature the addition of alkoxy phenols to pure anhydrous furfural containing a foaming agent does not affect the foaming characteristics. This is in marked contrast to their effect upon foaming hydrocarbon oils. The tests with lean furfural were entirely similar, showing that the presence of water does not alter the nature of the results, and that foam producers other than the turbine oil which are present in the lean furfural are no more easily suppressed.

fluid boiling at about 300° F. (B. P. of furfural is 322° F.) was obtained and tested in concentrations ranging from a trace to six volume per cent in furfural containing impurities found in the furfural system in the butadiene plant. In no case were any foam suppressing properties noted even in the concentrations beyond the solubility limit of the silicone in furfural. (The solubility in lean furfural at room temperature is approximately 1½ volume per cent.) The test was run on DC–500,

TABLE II

*Foaming characteristics of anhydrous vacuum distilled furfural+0.04% turbine oil*

[Room temperature]

| Inhibitor | | Percent Inhibitor | | | | | | | | | | |
|---|---|---|---|---|---|---|---|---|---|---|---|---|
| | | 0.00 | 0.01 | 0.02 | 0.03 | 0.04 | 0.05 | 0.06 | 0.07 | 0.10 | 0.20 | 0.30 |
| Eugenol | Inches [1] | 8.75 | 9 | | 8.75 | 9 | 9 | 9 | | 8.75 | | 8.75 |
| | Seconds [2] | 16.5 | 16.2 | | 16.5 | 17.0 | 16.5 | 16.1 | | 16.2 | | 16.8 |
| Isoeugenol | Inches | 9.5 | | 9.5 | 9.5 | | 9.5 | | 9.5 | 9.5 | 9.25 | 9.5 |
| | Seconds | 18.0 | | 17.1 | 17.8 | | 17.2 | | 17.2 | 17.5 | 16.5 | 17.5 |
| Guaiacol | Inches | 9.75 | | 9.5 | 9.5 | 9.5 | 9.5 | | 9.5 | 9.75 | 9.5 | 9.5 |
| | Seconds | 17.0 | | 17.0 | 17.0 | 17.0 | 17.0 | | 17.0 | 18.0 | 17.0 | 17.2 |
| Vanillin | Inches | 9.75 | 9.75 | | | | | | | | 9.75 | |
| | Seconds | 17.5 | 17.5 | | | | | | | | 17.5 | |
| Hydroquinone Monomethyl Ether. | Inches | 9.5 | 9.5 | | | | | | | | 9.5 | |
| | Seconds | 17.0 | 17.0 | | | | | | | | 17.0 | |

[1] Foam height in inches.
[2] Time in seconds for the foam to disappear after the $C_4$ hydrocarbon gas was shut off.

TABLE III

*Foaming characteristics of lean furfural*

[Room temperature]

| Inhibitor | | Percent Inhibitor | | | | | | | | | | |
|---|---|---|---|---|---|---|---|---|---|---|---|---|
| | | 0.00 | 0.01 | 0.02 | 0.03 | 0.04 | 0.05 | 0.06 | 0.08 | 0.10 | 0.20 | 0.30 |
| Eugenol | Inches [1] | 7.5 | 7.5 | | | 7.0 | | 7.25 | | 7.25 | | 7.0 |
| | Seconds [2] | 14.0 | 14.0 | | | 13.2 | | 13.5 | | 13.8 | | 13.2 |
| Isoeugenol | Inches | 7.25 | | 7.25 | | | 7.25 | | 7.25 | | 7.25 | 7.25 |
| | Seconds | 13.6 | | 13.6 | | | 13.6 | | 13.6 | | 13.6 | 13.6 |
| Guaiacol | Inches | 7.5 | | 7.25 | | | 7.25 | | 7.25 | | 7.25 | 7.25 |
| | Seconds | 14.0 | | 13.6 | | | 14.0 | | 14.0 | | 13.6 | 13.6 |
| Vanillin | Inches | 7.5 | | | | | | | | | 7.5 | |
| | Seconds | 14.0 | | | | | | | | | 14.0 | |
| Hydroquinone monomethyl Ether. | Inches | 7.5 | | | | | | | | | | 8.0 |
| | Seconds | 14.0 | | | | | | | | | | 14.4 |
| 2-Methoxy-4-methyl Phenol. | Inches | 6.75 | | | | | | | | | | 6.5 |
| | Seconds | 12.0 | | | | | | | | | | 12.0 |
| 2-Hydroxy-3-methoxy-benzaldehyde. | Inches | 6.5 | | | | | | | | | | 6.25 |
| | Seconds | 12.0 | | | | | | | | | | 11.0 |
| Vanillyl Alcohol | Inches | 6.5 | | | | | | | | | | 6.5 |
| | Seconds | 11.5 | | | | | | | | | | 12.0 |

[1] Foam height in inches.
[2] Time in seconds for the foam to disappear after the $C_4$ hydrocarbon gas was shut off.

More extensive investigations would require similar tests made at elevated temperatures. However, experience indicates that it is improbable that any inhibiting effect would appear then either. The work with all of these examples of antifoam agents being uniformly unsuccessful shows clearly the fact that unique properties, not shown by many good antifoam agents, are required in this furfural-$C_4$ system.

One disadvantage of using organic silicon compounds of the invention represented by Dow Corning "Antifoam A" and "DC–200 Fluid" lies in the fact that these compounds are relatively nonvolatile at the temperature required in distilling furfural in the furfural rerun unit. Antifoam agents of this type are lost in the bottoms product of the furfural rerun unit and in the butane wash (when used) and apparently are not recoverable. This requires considerable make-up to replace the continuous loss of antifoam and in view of the fact that these silicone compounds cost in the neighborhood of $6.00 to $7.00 per pound, an attempt was made to find a silicone fluid boiling at about 300° F. so that the silicone would distill off with the furfural. Accordingly a DC–500 silicone fluid alone, and this material, itself, showed foaming properties which may account for its failure as a foam suppressor. The composition of "DC–500" is not known.

Nalco 70 and Nalco 71 foam suppressors were tested in concentrations of 2 to 100 parts per million in furfural and these materials were found ineffective as foam suppressors. Nalco 70 is recommended for foam solutions containing petroleum solvents, while Nalco 71 is recommended for aqueous solutions. It was found that Nalco apparently does have surface active properties, but these do not impart any antifoaming characteristics to furfural solvent containing the usual impurities when bubbling hydrocarbon gases therethrough. The exact composition of the Nalco agents is unavailable, but it is known that they contain polyalkylene polyamides.

Another group of antifoaming agents, including Foamrex "E," Foamrex "XT–709–S," Foamrex XT–709–T, and Defoamer 4, were tested for antifoaming characteristics in lean furfural by the methods described above utilizing concentrations in the range of 0.1 to 0.75 weight per cent of the solution. All of these agents failed to show any reduction in foaming characteristics of furfural, and when they were added to foaming furfural they reduced the foam height only a few inches, and after a period of 30 seconds the foam height was restored and sometimes exceeded the original foam height.

The effects of the addition to lean furfural before foam begins is shown in Table IV.

TABLE IV

*Antifoams added to lean furfural before foaming*

| Agent | Conc. in Furfural, Wt. Percent | Max. Foam Height Before (Inches) | Max. Foam Height After (Inches) |
| --- | --- | --- | --- |
| Foamrex E | 0.1 | 10 | 11 |
|  | 0.5 | 10 | 11½ |
| Foamrex XT-709-S | 0.1 | 10 | 10 |
|  | 0.5 | 10 | 10 |
| Foamrex XT-709-T | 0.1 | 10 | 10½ |
|  | 0.5 | 10 | 10 |
| Defoamer 4 | 0.75 | 10 | 10½ |
|  | 0.50 | 10 | 10 |
|  | 0.25 | 10 | 10 |

In contrast to the failure of the antifoams listed in Table IV, polydimethyl siloxanes, having a viscosity in the range of 100 to 1000 centistokes when utilized in a concentration of only 20 parts per million in a lean furfural system in which the foam height is 12¾ inches before its addition, reduces the foam height to only 5½ inches. When utilized in a concentration of 10 parts per million the foam height is reduced to 8½ inches.

The class of organo-silicon polymers which have been found effective in the process of the invention are represented by the empirical formula,

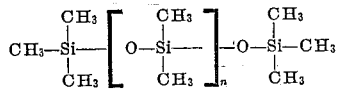

wherein $n$ is an integer resulting in a compound having a viscosity of at least 40 centistokes, and preferably at least 100 c. s., at 25° C. and may be classed as polydimethyl siloxanes. These compounds are colorless, odorless, inert liquids which vary in viscosity upwardly from about 1 centistoke at 25° C. to about a million centistokes. "DC 200 Fluids" marketed by Dow Corning Corporation in the viscosity range of 100 to 1000 centistokes at 25° C. have been utilized successfully in a furfural system to reduce foaming and increase the efficiency of the butadiene manufacturing process. Also, polydimethyl siloxanes of honey-like consistency (extremely high viscosity) have been found very effective for my purpose.

The more viscous compounds of this type of siloxanes are more effective when they contain a dispersion of a suitable wetting agent. Preferred wetting agents are the salts of alkylaryl sulfonic acid, such as the alkali metal, ammonium, ethanol-amine, guanidine, etc., salts generally termed sulfonates. Petroleum sulfonates as well as synthetic sulfonates which produce emulsions of the oil-in-water type, may be used with the polymeric organo-silicones in the process. The preferred compounds are the monosulfonated, monoalkylated benzenes in which the alkyl group contains from 12 to 16 carbon atoms, and preferably 14. Nacconol NR and NRSF and Santomerse No. 1 and D are products in this class of compounds.

The amount of wetting agent may be in the range of 0.1 to 5.0 weight per cent of the siloxane introduced into the furfural system.

It is also found advantageous to use a mixture of a relatively low viscosity polydimethyl siloxane (40 to 1000 centistokes, e. g.) and one of these compounds of honey-like consistency. When mixed, the less viscous siloxane readily disperses the more viscous compound and renders its dispersion in the furfural system more simple.

The more viscous type of compound is represented by "DC Antifoam A" marketed by Dow Corning Corporation. When dispersed in deoiler bottoms and introduced to the furfural system described hereinafter, "DC Antifoam A" has effected outstanding results.

For a more complete understanding of the invention, reference may be had to the drawing which is a schematic showing of an arrangement of apparatus and flow of materials according to the invention.

Butane is passed through line 1 into heater A, where it is preheated, then through line 2 into dehydrogenator B wherein approximately one-third to one-half of the butane is dehydrogenated to butenes. The products of reaction pass through conduit 3 into compressor system C where they are compressed and cooled between stages in conventional manner. The dehydrogenation effluent consists principally of hydrogen, butene-1, butenes-2 (both low and high boiling) and normal butane. Small quantities of light gases other than hydrogen (namely, methane, ethylene, ethane, propylene, and propane) are also formed in the reaction. Also, small quantities of isobutane, isobutylene and butadiene appear in the dehydrogenator effluent stream. The quantity of hydrocarbons containing 5 or more carbon atoms is extremely small.

The hydrocarbon vapors from the compression system C are passed via line 4 into conventional lean oil absorber D wherein $C_3$'s and lighter are removed overhead. The stripped hydrocarbons from absorber D are passed through line 5 into a fractionator column E. The fractionator E is operated in such a manner as to remove butene-1 and essentially all of the butadiene and lighter hydrocarbons as an overhead product which is passed through line 6 to a second fractionator R which operates as a depropanizer. The $C_3$ and lighter not removed in absorber D are removed from the system as an overhead product through line 7. The kettle product from fractionator E which contains n-butane, butene-2's and heavier hydrocarbons is removed from fractionator E and passed through line 8 into deoiler or fractionator S. The $C_5$'s and heavier are removed from fractionator S through line 9. Butane and butene-2's are removed as an overhead product from fractionator S through line 10 and enter absorber F wherein separation between n-butane and butene-2's is accomplished by liquid-vapor contacting of the hydrocarbon and the furfural-containing selective solvent of the invention described herein. The unabsorbed hydrocarbons, consisting principally of n-butane, pass out of absorber F as an overhead product through line 11 and are recycled into heater A through line 1. Rich solvent, containing principally butene-2's, passes from the absorber F as a kettle product through line 12 into solvent stripper G wherein stripped solvent is removed as a kettle product and recycled through line 35 to the absorber F. Butene-2's are removed as an overhead product and are passed through line 13 to line 14 to be used as feed in the dehydrogenation of butenes to produce butadiene which will now be described.

Hydrocarbon feed consisting essentially of butenes is passed into heater H through line 14 wherein the hydrocarbons are heated to a dehydrogenation temperature and are passed through line 15 into a catalytic dehydrogenation unit I wherein principally butadiene-1,3 is produced. The reaction effluent from dehydrogenation unit I consisting principally of butadiene, isobutylene, butene-2, n-butane and butenes is passed through line 16 into a compression system J and the compressed effluent is then passed through line 17 into a conventional lean oil absorption system wherein $C_3$'s and lighter are removed as an overhead product. The $C_4$'s and heavier and absorbed $C_3$'s are passed into a fractionator L through line 18. Remaining $C_3$'s and lighter are removed as an overhead product from fractionator L and the kettle product, consisting principally of $C_4$'s and heavier, is passed into fractionator M through line 19. The kettle product from fractionator R passes through line 20, is combined with the hydrocarbons in line 19, and is also passed into fractionator M. In fractionator M most of the high boiling butene-2 as well as part of the low boiling butene-2 and C4 acetylenes are removed as bottom product through line 21 and passed into deoiler or fractionator X wherein C4's are removed as an overhead product and these are recycled through line 22 to line 14. The overhead product from fractionator M consisting of substantially all of the butadiene produced in dehydrogenators H and I and the more volatile hydrocarbons is removed through line 23 and passed into absorber N wherein butene-1 is separated from butadiene through the use of the selective solvent of the invention. The separation is carried out to remove isobutylene overhead with the butene-1 while the absorbed butadiene in the solvent is removed from the kettle via line 24. The overhead product from absorber N is passed through line 25, joining line 13, and is combined with the feed to heater H in line 14. The rich solvent containing absorbed butadiene, butene-2, and minor amounts of other hydrocarbons passes from the kettle of absorber N through line 24 into stripper O wherein the hydrocarbons are stripped from the solvent and removed as an overhead product through line 26 through which they are passed into a 120-tray fractionating column P wherein butadiene is removed from approximately the 101st tray as the product of the process via line 31. The acetylenes and lighter hydrocarbons are removed as an overhead product through line 27. The kettle product from fractionator P is passed through line 28 into a deoiler or fractionating column Y, wherein C5's and heavier hydrocarbons are removed as a kettle product through line 29 and C4's and lighter are removed through line 30 and passed to line 19 as feed into fractionator M to recover residual butadiene. Stripped or lean furfural is recycled from stripper O to absorber N through line 39. In the drawing heat exchangers, condensers, pumps, valves, and reflux are not shown but are understood to be used as in conventional operations.

The polydimethyl siloxanes are added to the furfural system including the furfural absorbers and strippers F, G, N, and O. The antifoam agent may be dispersed into the furfural by any suitable means. The preferred method of adding the antifoam agent is to dissolve 4 pounds of the material in 45 gallons of deoiler kettle bottoms such as that produced in fractionators S, X and Y. The dispersed antifoam agent may be added at any conventional point in the furfural circulation system. I have found it convenient to add the dispersed antifoam agent into the lean furfural stream entering the furfural absorber F. The lean furfural passes from the step (2) and step (4) strippers into a common surge tank, thereby dispersing the antifoam agent throughout the furfural system.

The solvent of the invention consisting essentially of furfural, C5-C10 hydrocarbons (principally butadiene dimer) produced in the dehydrogenators and gradually accumulated in the furfural system, and the antifoam is maintained within the proper range of constituents by passing deoiler bottoms from line 9 via line 33 to a mixing tank or reservoir U, mixing the hydrocarbons with antifoam admitted via line 34 to form a uniform dispersion, and introducing the dispersion into solvent recycle line 35 via line 36. Make-up furfural is introduced to the system via line 37 leading into solvent recycle line 35 but may be introduced at other suitable points. Deoiler bottoms from deoilers or fractionators X and Y may also be used as the source of hydrocarbons for dispersion of the antifoam agent in tank U. The rate of injection of the dispersion into the system and the concentration of the antifoaming agent therein are controlled to maintain the desired amount of the antifoam agent in the solvent. The injection into the system of C5-C10 hydrocarbons containing the dispersed antifoam agent may be effected in line 39 leading to the step 4 absorbers as well as in line 35 in the step 2 furfural system.

The various streams described are not limited strictly to the constituents named and it should be understood that complete separation of one C4 hydrocarbon from another and of C5 and heavier hydrocarbons from the C4 hydrocarbons is not effected. For instance, the n-butane and butene-2 stream in line 8 leading from fractionator E to fractionator S contains, in addition to the constituents named, a minor amount of C5's and heavier hydrocarbons and even after separation in fractionator S, the resulting stream still contains a very small amount of C5 and heavier hydrocarbons which pass into absorber F. It is this residual C5 and heavier hydrocarbon, containing principally butadiene dimer with minor amounts of ethyl benzene and xylenes, which gradually builds up in the furfural system and which has heretofore caused sufficient column flooding or stacking that it was necessary to install a butane wash unit in the lean furfural line so as to maintain this oil content below about 3 weight per cent of the furfural solvent. It has now been found that these oils improve the solvent when allowed to remain in the furfural and this has led to the development of a new phase of furfural extractive distillation.

The first plant scale test of a polydimethyl siloxane was made using DC Antifoam A in a plant producing approximately 5000 tons of butadiene per month. This plant utilizes 2 absorbers in both the step (2) and the step (4) separations and follows the general arrangement shown in the drawing. The concentration of the DC-A in the lean furfural was varied from 0.4 to 10.7 parts per million based on the weight of the lean furfural. The injection of DC-A into the furfural system was accomplished by pumping a suspension of the antifom dispersed in deoiler kettle product into the lean furfural line leading into the top section of the No. 1 furfural absorber in step 2. The dispersion was pumped from an open tank suction reservoir with a capacity of 55 gallons into the lean furfural at the rate of 50 gallons per day. The rate of DC-A injection was controlled by the concentration of the slurry. Agitation necessary to keep the foam in suspension was provided by bubbling air through the slurry. Observations of column performance were made daily by means of a look-box located on the 65th tray (from the bottom of the column) of the No. 1 furfural absorber in step 2 for a period of about one month before injection of the antifoam was initiated. The liquid level on the plate was estimated with reference to an eyebolt in the center of the tray which extended 3¾ inches above the bubble caps. Feed rates and temperatures, column conditions, liquid levels and the appearance of the furfural, and tray action were recorded for each observation to provide a comparison for the subsequent test. Within ten minutes after beginning the injection of DC-A, the liquid level on the 65th tray of the No. 1 absorber began to drop. After one hour the level was approximately two inches lower than before the test. The color of the furfural froth turned from a creamy white to a dirty yellow color indicating less foam than prior to injection.

After a short period of operation with the antifoam in the furfural, the butane wash unit was shut down and, as the oil concentration in the furfural built up, no foaming difficulties were experienced. While the butane wash was operating a concentration of approximately three parts per million was maintained in the system by the injection of five pounds of antifoam per day. The injection rate of antifoam was reduced to 4 pounds per day and no significant difference in liquid level on the trays or change in column performance was noted. As a result of decreased furfural polymer formation during the test, the furfural rerun feed rate was reduced from 5000 to 4000 gallons per hour and this had the effect of increasing the concentration of DC-A in the furfural system.

As a result of the utilization of DC Antifoam A in the plant described, smoother operation and increased production were obtained, even during the cold months of the year when the greatest difficulty from stacking due to foaming always occurs. Before the injection of DC–A into the furfural system of the plant, hydrocarbon feed rates of 10,000 G. P. H. to the step 2, No. 1 absorber and 13,000 G. P. H. to the step 2, No. 2 absorber were about as high as could be maintained for any length of time without excessive stacking occurring (without addition of the antifoam to the furfural). During continuous injection of antifoam, feed rates of 12,000 G. P. H. on the No. 1 absorber and 15,500 G. P. H. on the No. 2 absorber were maintained with no particular difficulty due to stacking. Comparable benefits were obtained in the step 4 absorbers.

The use of DC Antifoam A together with the use of a furfural solvent containing an appreciable amount of $C_5$ to $C_{10}$ hydrocarbons (principally butadiene dimer, ethyl benzene, and para-xylene) has resulted in the production of a product of increased purity. The absorbers make the key separations of each purification step and any factor influencing these separations is reflected in efficiencies throughout the entire plant. For this reason, the most important indirect benefit of the invention is the increased separation of key components experienced in the purification steps. In step 2 operation, the increased separation is not so pronounced as in step 4, but a substantial increase in the efficiency of separation was effected. A particular advantage appeared in the decrease in butadiene losses overhead in the absorbers. In step 4 the concentration of butadiene in the absorber overhead was decreased from an average of 1.9 per cent to 0.8 per cent by weight due to the use of the antifoam and improved furfural-oil solvent. Since about 40 per cent of any butadiene present in step 3 feed is destroyed over the catalyst therein and 100 per cent of the butadiene sold in the butylenes is lost production, this decrease in butadiene concentration from 1.9 per cent to 0.8 per cent resulted in a saving of approximately 108 tons of butadiene per week.

By making a better separation in step 4 absorbers, less butene-1 is fed to the butadiene column. Since butene-1 cannot be adequately fractionated from butadiene a decrease of this component in the butadiene column feed reduces the difficulty in producing specification butadiene. The step 4 furfural absorbers are controlled by the mol fraction of butene-1 on the 26th tray. Before the use of DC–A this ran in the order of 15 to 15.5 mol per cent, while the value during the use of the antifoam was of the order of 3 to 6 per cent. By reducing the butene-1 in the feed to the butadiene column a better separation between butene-2 and butadiene was accomplished. This resulted in less butadiene in the kettle product. The analysis of the butadiene column fifth tray showed a decrease from 60 per cent to about 35 per cent butadiene. This permitted a substantial reduction of step 4 recycle since this kettle product is recycled through the entire step 4. A "snow-balling" effect is produced since reduced recycle butadiene means less butadiene in the feed to the absorbers. This enables a still better separation in the absorbers which in turn enables a better separation in the butadiene column. From this it is apparent that once a better separation is obtained at any key point in step 4, the "snow-ball" effect produces a better and better separation. As a result, a demonstrated capacity increase of 16.7 per cent in step 4 was obtained. Before the injection of DC Antifoam A, the average overhead butadiene loss was 1.6, while the average loss was only 0.7 during utilization of the antifoam. This represents a 56 per cent decrease in butadiene lost in the overhead. These data were obtained by comparing the 4 months average before the use of antifoam with a 3 months average utilizing antifoam. Data on the preceding page compares the butadiene constituents in the absorber overhead for the last month in which only antifoam was used with that found in the overhead in a typical subsequent month when antifoam was not used.

Since the initiation of continuous injection of antifoam, there has been a substantial decrease in the loss of furfural. This decrease is primarily due to a reduction in processing in the butane wash and rerun units, reduced polymer formation, and increased dilution with oils. These factors are more or less interrelated since a reduction in rerun rates requires less furfural processing and contributes to a reduction in furfural losses. Another advantage was found in the reduction of polymerization and corrosion. The high oil content of the furfural permitted by the use of the antifoam has materially reduced the reboiler temperatures in step 2 absorbers. Since polymerization is a function of temperature, this accounts for the decrease in the amount of polymerization.

A reduction of polymer formation has been responsible to a considerable extent for increased pH values of the furfural system. Since the pH is an index of the amount of acids present, it is also an index of the corrosion characteristics of the solution. A certain percentage of the polymers formed in the furfural system are heavy acids; therefore less corrosion is encountered with a reduction in polymer formation. Shutting down of the butane wash unit also contributed to an increased pH by permitting a larger residual of triethanolamine (TEA) salts to build up in the furfural by not removing the added salts from the system. The average pH of the furfural system prior to injection of DC–A was approximately 5.0 and this was increased to more than 6 and reached as high as 6.6 during use of the antifoam without the butane wash treatment. The injection of TEA into the furfural system has been resorted to in order to bring the pH of the furfural system up to a point at which the corrosion difficulties are substantially reduced. Before the use of DC Antifoam A, the rate of injection of TEA ran as high as 46 gallons per day, while during the use of the antifoam the rate of injection was reduced to as low as 22 gallons per day even though the plant was producing considerably more butadiene and processing more hydrocarbons. And in spite of the decreased injection rate, the pH of the furfural system was increased appreciably to $7 \pm 0.2$. It is also feasible to maintain this pH by adding 20 pounds of caustic and 20 pounds of TEA per day to the furfural.

Another advantage of the use of the specific antifoams of the invention, and particularly DC–A, is in the increase in instrument service life. The spectro equipment on instruments used to analyze control samples from the furfural absorbers has been subjected to considerably less contamination and therefore, the service factor of these instruments has been materially increased.

Probably the most important and surprising result of the use of siloxane type antifoam agent in the plant process has been in the increase in the production of butadiene of specification grade. Before injection of the DC–A into the furfural system of the plant, the average butadiene production per month was less than 5,000 tons, while with the continuous use of the antifoam, the production of butadiene has been maintained at an average of at least 6,000 tons per month over a several months period.

The solvent and process of the invention are applicable to the separation of $C_4$ hydrocarbons from sources other than n-butane and butene dehydrogenation. Other $C_4$ fractions such as those from refinery streams are amenable to separation by the process of the invention.

The use of DC Antifoam A in actual plant scale production of butadiene has conclusively demonstrated the following advantages:

(1) Reduction of stacking and smoother plant operation
(2) A material increase in the capacity of the absorbers.
(3) Elimination of the butane wash step.
(4) An increase in the service factor of the control instruments.

(5) An increase in the efficiency of the absorbers resulting from lower overhead losses, better separation in the butadiene column, increased capacity, and better solvent (including the oils formed in the process).
(6) A 56 per cent reduction in overhead butadiene losses.
(7) A decrease in TEA injection rates.
(8) Substantially lower rerun rates.
(9) Decreased polymer formation.
(10) Decreased corrosion of equipment.
(11) Decreased furfural losses.
(12) Decreased plugging of rerun lines.
(13) At least a 20 per cent increase in the production of butadiene with the same plant equipment and an increase in the purity of the butadiene.

The illustrative details set forth herein are not to be construed as imposing unnecessary limitations upon the invention, the scope of which is set forth in the claims.

This is a continuation-in-part application of application Serial No. 238,907, filed July 27, 1951, now abandoned.

I claim:

1. A process for the manufacture of olefins from normal butane which comprises, catalytically dehydrogenating normal butane to said olefins, subjecting the C$_4$ hydrocarbon content of the reaction effluent to fractional distillation so as to remove the butene-1 content thereof as an overhead product and produce a bottoms product containing principally the n-butane and butene-2 content thereof, subjecting the resulting mixture of n-butane and butene-2 to extractive distillation with a solvent comprising essentially a mixture of furfural, 1 to 60 weight per cent of C$_5$–C$_{10}$ hydrocarbons formed in said process and comprising principally butadiene dimer, and liquid polydimethyl siloxane of the formula

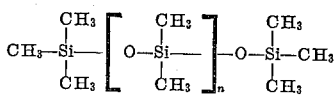

wherein $n$ is an integer resulting in a compound having a viscosity of at least 40 centistokes at 25° C. in a concentration effective in reducing the foam height of the furfural system so as to selectively dissolve butene-2, and stripping the dissolved butene-2 from the rich solvent.

2. The process of claim 1 wherein the amount of C$_5$–C$_{10}$ hydrocarbons is in the range of 10 to 30 weight per cent of furfural-hydrocarbon solvent.

3. The process of claim 1 in which the concentration of the siloxane is in the range of 1 to 20 parts per million based on the weight of the solvent.

4. The process of claim 3 in which a sulfonate type wetting agent is incorporated in the siloxane in an amount in the range of 0.1 to 5.0 weight per cent of the siloxane.

5. A process for the manufacture of butadiene from normal butane which comprises, catalytically dehydrogenating normal butane to normal butenes in a first stage dehydrogenation, subjecting the C$_4$ hydrocarbon content of the reaction effluent to fractional distillation so as to remove the butene-1 content thereof as an overhead product and produce a bottoms product containing principally the n-butane and butene-2 content thereof, subjecting the resulting mixture of n-butane and butene-2 to extractive distillation with a solvent comprising essentially a mixture of furfural, 1 to 60 weight per cent of C$_5$–C$_{10}$ hydrocarbons formed in said process comprising principally butadiene dimer, and liquid polydimethyl siloxane of the formula

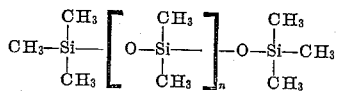

wherein $n$ is an integer resulting in a compound having a viscosity of at least 40 centistokes at 25° C. in a concentration in the range of 1 to 20 parts per million so as to selectively dissolve butene-2, stripping the dissolved butene-2 from the rich solvent, combining the butene-1 separated by said fractional distillation step with the butene-2 separated by said extractive distillation and stripping steps to form a second stage dehydrogenation feed, catalytically dehydrogenating said feed to butadiene, and recovering butadiene from the reaction effluent.

6. A process for the manufacture of butadiene from normal butane which comprises, catalytically dehydrogenating normal butane to normal butenes in a first stage dehydrogenation, subjecting the C$_4$ hydrocarbon content of the reaction effluent to fractional distillation so as to remove the butene-1 content thereof as an overhead product and produce a bottoms product containing principally the n-butane and butene-2 content thereof, subjecting the resulting mixture of n-butane and butene-2 to extractive distillation with a solvent comprising essentially a mixture of furfural, 1 to 60 weight per cent of C$_5$–C$_{10}$ hydrocarbons formed in said process comprising principally butadiene dimer, and liquid polydimethyl siloxane of the formula

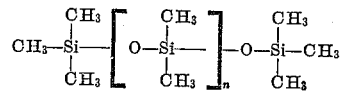

wherein $n$ is an integer resulting in a compound having a viscosity of at least 40 centistokes at 25° C. in a concentration in the range of 1 to 20 parts per million so as to selectively dissolve butene-2, stripping the dissolved butene-2 from the rich solvent, combining the butene-1 separated by said fractional distillation step with the butene-2 separated by said extractive distillation and stripping steps to form a second stage dehydrogenation feed, catalytically dehydrogenating said feed to butadiene, recovering the C$_4$ fraction of the second stage dehydrogenation effluent, subjecting the C$_4$ fraction thus recovered to extractive distillation with said solvent so as to selectively dissolve a first fraction containing substantially all of the butadiene content thereof and some of the butene-2 content and allow to pass through undissolved a second fraction containing principally the isobutylene, butene-1, and n-butane content thereof, stripping said first fraction from the rich solvent, and fractionally distilling the stripping first fraction so as to recover an overhead fraction consisting essentially of pure butadiene.

7. A process for the manufacture of butadiene from normal butenes which comprises catalytically dehydrogenating normal butenes to butadiene, recovering the C$_4$ fraction of the reaction effluent, subjecting the C$_4$ fraction thus recovered to extractive distillation with a solvent comprising essentially furfural, 1 to 60 weight per cent of C$_5$–C$_{10}$ hydrocarbons formed in said process comprising principally butadiene dimer, and liquid polydimethyl siloxane of the formula

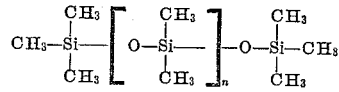

wherein $n$ is an integer resulting in a compound having a viscosity of at least 40 centistokes at 25° C. in a concentration in the range of 1 to 20 parts per million so as to selectively dissolve a first fraction containing substantially all of the butadiene content thereof and some of the butene-2 content and allow to pass through undissolved a second fraction containing principally the isobutylene and butene-1 content thereof, stripping said first fraction from the rich solvent, and fractionally distilling the stripped fraction so as to recover an overhead fraction consisting essentially of pure butadiene.

8. A process for the manufacture of olefins from normal butane which comprises, catalytically dehydrogenating normal butane to said olefins, subjecting the C$_4$ hydrocarbon content of the reaction effluent to fractional distillation so as to remove the butene-1 content thereof as an overhead product and a bottoms product containing principally n-butane, butene-2, and a minor amount of C₅ and heavier hydrocarbons, subjecting said bottoms product to fractional distillation so as to remove the n-butane and butene-2 content thereof as an overhead fraction and a bottoms product containing C₅ and heavier hydrocarbons, forming a dispersion of liquid polydimethyl siloxane of the formula

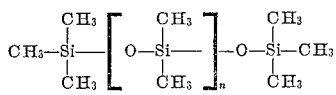

where $n$ is an integer resulting in a compound having a viscosity of at least 40 centistokes at 25° C. in the C₅ to C₁₀ cut of said C₅ and heavier bottoms product, mixing said dispersion with furfural containing 1 to 60 weight per cent of C₅–C₁₀ hydrocarbons to form a selective solvent for extractive distillation of C₄ hydrocarbons containing 1 to 20 parts per million of said siloxane, subjecting the n-butane and butene-2 overhead fraction from the preceding distillation to extractive distillation with said solvent so as to selectively dissolve the butene-2 content thereof, and stripping the dissolved butene-2 from the rich solvent.

9. A process for the manufacture of butadiene from normal butane which comprises, catalytically dehydrogenating normal butane to normal butenes in a first stage dehydrogenation, subjecting the C₄ hydrocarbon content of the reaction effluent to fractional distillation so as to remove the butene-1 content thereof as an overhead product and a bottoms product containing principally the n-butane and butene-2 content thereof, subjecting the resulting mixture of n-butane and butene-2 to extractive distillation with a solvent consisting essentially of furfural, 1 to 60 weight per cent of C₅–C₁₀ hydrocarbons formed in said process and comprising principally butadiene dimer, and liquid polydimethyl siloxane of the formula

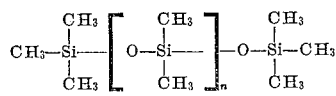

wherein $n$ is an integer resulting in a compound having a viscosity of at least 40 centistokes at 25° C. in a concentration effective in reducing the foam height of the furfural system so as to selectively dissolve butene-2, stripping the dissolved butene-2 from the rich solvent, combining the butene-1 separated by said fractional distillation step with the butene-2 separated by said extractive distillation and stripping steps to form a second stage dehydrogenation feed, catalytically dehydrogenating said feed to butadiene, recovering a fraction from the second stage dehydrogenation effluent consisting essentially of C₄ and heavier hydrocarbons, subjecting said C₄ and heavier fraction to fractional distillation so as to recover an overhead fraction containing principally C₄ hydrocarbons and a C₅ and heavier bottoms product, forming a dispersion of said siloxane in said C₅ and heavier fraction, mixing said dispersion with furfural containing 1 to 60 weight per cent C₅–C₁₀ hydrocarbon containing principally butadiene dimer to form a solvent of the composition of the aforesaid solvent, subjecting the C₄ overhead fraction from the preceding distillation step to extractive distillation with said solvent so as to selectively dissolve a first fraction containing substantially all of the butadiene content thereof and some of the butene-2 content and allow to pass through undissolved a second fraction containing principally the isobutylene, butene-1, and n-butane content thereof, stripping said first fraction from the rich solvent, and fractionally distilling the stripped first fraction so as to recover an overhead fraction consisting essentially of pure butadiene.

10. The process of claim 8 in which the concentration of siloxane is in the range of 1 to 20 parts per million based on the weight of the solvent.

11. The process of claim 8 in which a mixture of a low viscosity siloxane and a highly viscous siloxane of honey-like consistency is utilized as the polydimethyl siloxane.

12. The process of claim 10 in which a wetting agent is incorporated in the siloxane mixture in an amount in the range of 0.1 to 5.0 weight per cent of the siloxane mixture.

13. A process for the manufacture of olefins from normal butane which comprises, catalytically dehydrogenating normal butane to said olefins, subjecting the C₄ hydrocarbon content of the reaction effluent to fractional distillation so as to remove the butene-1 content thereof as an overhead product and a bottoms product containing principally n-butane, butene-2, and a minor amount of C₅ and heavier hydrocarbons, subjecting said bottoms product to fractional distillation so as to remove the n-butane and butene-2 content thereof as an overhead fraction and a bottoms product containing C₅ and heavier hydrocarbons, forming a dispersion of liquid polydimethyl siloxane of the formula

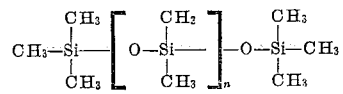

wherein $n$ is an integer resulting in a compound having a viscosity of at least 40 centistokes at 25° C. in a liquid dispersing medium inert in the process, mixing said dispersion with furfural containing from 1 to 60 weight per cent of C₅–C₁₀ hydrocarbons containing chiefly butadiene dimer so as to form a selective solvent for extractive distillation of C₄ hydrocarbons containing 1 to 20 parts per million of said siloxane, subjecting the n-butane and butene-2 overhead fraction from the preceding distillation to extractive distillation with said solvent so as to selectively dissolve the butene-2 content thereof, and stripping the dissolved butene-2 from the rich solvent.

14. A process for the manufacture of butadiene from normal butane which comprises, catalytically dehydrogenating normal butane to normal butenes in a first stage dehydrogenation, subjecting the C₄ hydrocarbon content of the reaction effluent to fractional distillation so as to remove the butene-1 content thereof as an overhead product and a bottoms product containing principally the n-butane and butene-2 content thereof, subjecting the resulting mixture of n-butane and butene-2 to extractive distillation with a solvent comprising essentially furfural, 1 to 60 weight per cent of C₅–C₁₀ hydrocarbons formed in said process and comprising principally butadiene dimer, and liquid polydimethyl siloxane of the formula

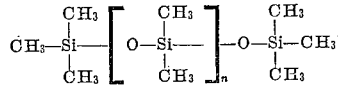

wherein $n$ is an integer resulting in a compound having a viscosity of at least 40 centistokes at 25° C. in a concentration in the range of 1 to 20 parts per million so as to selectively dissolve butene-2, stripping the dissolved butene-2 from the rich solvent, combining the butene-1 separated by said fractional distillation step with the butene-2 separated by said extractive distillation and stripping steps to form a second stage dehydrogenation feed, catalytically dehydrogenating said feed to butadiene, recovering a fraction from the second stage dehydrogenation effluent consisting essentially of C₄ and heavier hydrocarbons, subjecting said C₄ and heavier fraction to fractional distillation so as to recover an overhead fraction containing principally C₄ hydrocarbons and a C₅ and heavier bottoms product, forming a dispersion of said siloxane in an inert dispersing medium, mixing said dispersion with furfural containing 1 to 15 weight per cent C₅–C₁₀ hydrocarbons containing principally butadiene dimer to form a solvent of the composition of the aforesaid solvent, subjecting the C₄ overhead fraction from the preceding distillation step to extractive distillation with said solvent so as to selectively dissolve a first fraction containing substantially all of the butadiene content thereof and some of the butene-2 content and allow to pass through undissolved a second fraction containing principally the isobutylene, butene-1, and n-butane content thereof, stripping said first fraction from the rich solvent, and fractionally distilling the stripped first fraction so as to recover an overhead fraction consisting essentially of pure butadiene.

15. A process for the manufacture of butadiene from normal butane which comprises, catalytically dehydrogenating normal butane to normal butenes in a first stage dehydrogenation, subjecting the C₄ hydrocarbon content of the reaction effluent to fractional distillation so as to remove the butene-1 content thereof as an overhead product and produce a bottoms product containing principally the n-butane and butene-2 content thereof, subjecting the resulting mixture of n-butane and butene-2 to extractive distillation with the solvent prepared as hereinafter described so as to selectively dissolve butene-2, stripping the dissolved butene-2 from the rich solvent, combining the butene-1 separated by said fractional distillation step with the butene-2 separated by said extractive distillation and stripping steps to form a second stage dehydrogenation feed, catalytically dehydrogenating said feed to butadiene, recovering the C₄ and heavier fraction of the second stage dehydrogenation effluent, subjecting said last-named fraction to fractional distillation so as to recover the C₄ hydrocarbons as an overhead fraction and C₅ and heavier hydrocarbons as the bottoms product, forming a dispersion of liquid polydimethyl siloxane of the formula

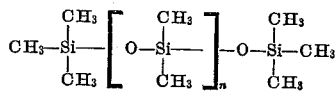

wherein $n$ is an integer resulting in a compound having a viscosity of at least 40 centistokes at 25° C. in an inert dispersing medium and mixing said dispersion with furfural so as to form a solvent consisting essentially of furfural, 1 to 60 weight per cent of C₅–C₁₀ hydrocarbons formed in said process, and 1 to 20 parts per million of said siloxane, subjecting the C₄ overhead fraction to extractive distillation with said solvent so as to selectively dissolve a first fraction containing substantially all of the butadiene content thereof and some of the butene-2 content and allow to pass through undissolved a second fraction containing principally isobutylene, butene-1, and n-butane, stripping said first fraction from the rich solvent and fractionally distilling the stripped first fraction so as to recover an overhead fraction consisting essentially of pure butadiene.

16. The process of claim 15 wherein said inert dispersing medium comprises said bottoms product.

17. The process of claim 15 in which the concentration of said siloxane in said bottoms product is in the range of 1 to 10 weight per cent of said dispersion.

18. The process of claim 8 in which the concentration of said siloxane in said C₅ to C₁₀ cut is in the range of 1 to 10 weight per cent of the dispersion.

19. The process of claim 9 in which the concentration of said siloxane in said C₅ and heavier fraction is in the range of 1 to 10 weight per cent of the dispersion.

20. A solvent effective in the selective extractive distillation of C₄ hydrocarbons consisting essentially of furfural, 1 to 60 weight per cent of C₅–C₁₀ hydrocarbons formed in the dehydrogenation of n-butane and n-butenes and comprising principally butadiene dimer, and liquid polydimethyl siloxane of the formula

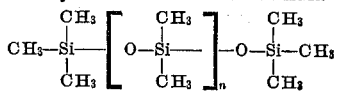

wherein $n$ is an integer resulting in a compound having a viscosity of at least 40 centistokes at 25° C. in a concentration effective in reducing the foam height of the furfural system.

21. A solvent effective in the selective extractive distillation of C₄ hydrocarbons consisting essentially of furfural, 10 to 30 weight per cent of C₅–C₁₀ hydrocarbons formed in the dehydrogenation of n-butane and n-butenes and comprising principally butadiene dimer, and liquid polydimethyl siloxane of the formula

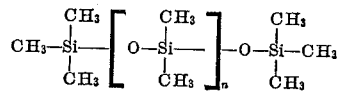

wherein $n$ is an integer resulting in a compound having a viscosity of at least 40 centistokes at 25° C. in a concentration in the range of 1 to 20 parts per million.

22. The method of eliminating the furfural washing step in a process for the separation of a mixture of C₄ hydrocarbons and a minor amount of C₅–C₁₀ hydrocarbons resulting from the catalytic dehydrogenation of n-butane and n-butenes in which a stream of the mixed hydrocarbons is contacted with furfural as a solvent in an extractive distillation step so as to selectively dissolve one of the hydrocarbons in the furfural, the rich furfural is then passed thru a stripping zone so as to remove the absorbed hydrocarbon therefrom, the lean furfural is again passed to the absorption zone for contact with additional mixed C₄ hydrocarbons, wherein the furfural solvent gradually absorbs impurities from the process comprising principally C₅–C₁₀ hydrocarbons, of which butadiene dimer is the principal constituent, in a concentration substantially above 3 weight per cent of the solvent, and wherein the furfural and C₅–C₁₀ hydrocarbon mixture is periodically washed with a washing agent which reduces the concentration of the C₅–C₁₀ hydrocarbons to less than about 3 per cent by weight of furfural, which method comprises maintaining in the furfural stream a concentration of liquid polydimethyl siloxane of the formula

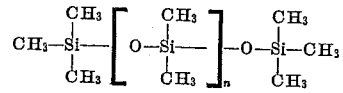

wherein $n$ is an integer resulting in a compound having a viscosity of at least 40 centistokes at 25° C. in the range of 1 to 20 parts per million so as to permit the use of a mixed solvent of furfural containing substantially more than 3 weight per cent of C₅–C₁₀ hydrocarbons formed in the process.

23. A process for separating a less saturated C₄ hydrocarbon from a more saturated C₄ hydrocarbon comprising subjecting a mixture of these hydrocarbons to extractive distillation with a solvent essentially comprising a mixture of furfural, from 1 to 60 weight per cent C₅–C₁₀ hydrocarbons, and at least 1 part per million of liquid polydimethyl siloxane of the formula

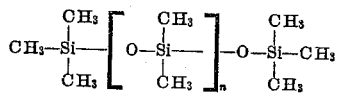

wherein $n$ is an integer resulting in a compound having a viscosity of at least 40 centistokes at 25° C.

24. A process for separating a mixture of C₄ hydrocarbons comprising principally n-butane, butene-1, and butene-2 which comprises removing the butene-1 content of said mixture as an overhead product by fractional distillation, subjecting the resulting mixture of n-butane and butene-2 to extractive distillation with a solvent essentially comprising a mixture of furfural, at least 3 weight per cent C₅–C₁₀ hydrocarbons, and at least 1 part per million of liquid polydimethyl siloxane of the formula

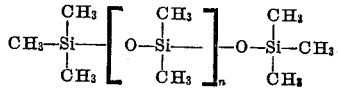

wherein $n$ is an integer resulting in a compound having a viscosity of at least 40 centistokes at 25° C.

25. The process of claim 24 in which the $C_5$–$C_{10}$ hydrocarbons are in the range of 10 to 30 weight per cent of said solvent.

26. A process for separating a mixture of $C_4$ hydrocarbons comprising principally butadiene, butene-1, butene-2, and isobutylene which comprises subjecting said mixture to extractive distillation with a solvent essentially comprising furfural, at least 3 weight per cent $C_5$–$C_{10}$ hydrocarbons and liquid polydimethyl siloxane of the formula

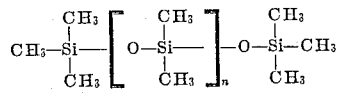

wherein $n$ is an integer resulting in a compound having a viscosity of at least 40 centistokes at 25° C. in a concentration in the range of 1 to 20 parts per million so as to selectively dissolve a first fraction containing substantially all of the butadiene content thereof and some of the butene-2 content and allow to pass through undissolved a second fraction containing principally the isobutylene and butene-1 content thereof, stripping said first fraction from the rich solvent, and fractionally distilling the stripped fraction so as to recover an overhead fraction consisting essentially of pure butadiene.

27. The process of claim 26 in which the $C_5$–$C_{10}$ hydrocarbons are in the range of 10 to 30 weight per cent of said solvent.

28. A solvent effective in the selective extractive distillation of $C_4$ hydrocarbons essentially comprising furfural, at least 3 weight per cent of $C_5$–$C_{10}$ hydrocarbons, and liquid polydimethyl siloxane of the formula

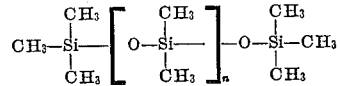

wherein $n$ is an integer resulting in a compound having a viscosity of at least 40 centistokes at 25° C. in a concentration effective in reducing the foam height of the furfural system.

29. A solvent effective in the selective extractive distillation of $C_4$ hydrocarbons essentially comprising furfural, from 10 to 30 weight per cent of $C_5$–$C_{10}$ hydrocarbons, and liquid polydimethyl siloxane of the formula

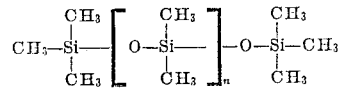

wherein $n$ is an integer resulting in a compound having a viscosity of at least 40 centistokes at 25° C. in a concentration effective in reducing the foam height of the furfural system.

References Cited in the file of this patent

UNITED STATES PATENTS

| | | |
|---|---|---|
| 2,373,951 | Evans et al. | Apr. 17, 1945 |
| 2,375,007 | Larsen et al. | May 1, 1945 |
| 2,449,427 | Thodos et al. | Sept. 14, 1948 |
| 2,610,942 | Read | Sept. 16, 1952 |

OTHER REFERENCES

"DC Antifoam A," Dow Corning Silicone Notebook Compound Series No. 1, Revised January 1949, 4 pages.